US009065762B2

(12) United States Patent
Ryu et al.

(10) Patent No.: US 9,065,762 B2
(45) Date of Patent: Jun. 23, 2015

(54) METHOD AND APPARATUS FOR CONTROLLING LOAD SHEDDING IN DATA STREAM MANAGEMENT SYSTEM

(75) Inventors: Seung-woo Ryu, Seoul (KR); Seok-jin Hong, Hwaseong-si (KR); Keun-joo Kwon, Seoul (KR); Yo-han J. Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 13/408,032

(22) Filed: Feb. 29, 2012

(65) Prior Publication Data

US 2012/0278463 A1    Nov. 1, 2012

(30) Foreign Application Priority Data

Apr. 28, 2011   (KR) ........................ 10-2011-0040139

(51) Int. Cl.

| | | |
|---|---|---|
| G06F 15/16 | (2006.01) |
| G06F 17/30 | (2006.01) |
| H04L 29/08 | (2006.01) |
| H04L 12/825 | (2013.01) |
| H04L 12/851 | (2013.01) |
| H04L 12/801 | (2013.01) |

(52) U.S. Cl.
CPC ............ *H04L 47/25* (2013.01); *G06F 17/3066* (2013.01); *H04L 67/10* (2013.01); *H04L 47/14* (2013.01); *H04L 47/24* (2013.01)

(58) Field of Classification Search
CPC .......... G06F 17/30516; G06F 17/3056; G06F 17/141; H04L 47/25; H04L 47/70; H04L 67/10; H04W 16/08; H04W 52/0277
USPC ......... 709/223–232, 217, 219, 221; 707/E17.014, 737, 770, 759; 702/181; 455/343, 453, 456.1; 370/230, 235; 600/300, 521; 718/100; 726/22, 23
See application file for complete search history.

(56) References Cited

U.S. PATENT DOCUMENTS

| | | | | |
|---|---|---|---|---|
| 7,236,795 | B2* | 6/2007 | Samuel ......................... 455/453 |
| 8,112,247 | B2* | 2/2012 | Turaga et al. ................. 702/181 |
| 2008/0275891 | A1* | 11/2008 | Park et al. .................... 707/100 |
| 2009/0049187 | A1* | 2/2009 | Gedik et al. .................. 709/231 |

(Continued)

FOREIGN PATENT DOCUMENTS

| | | |
|---|---|---|
| KR | 10-2006-0013259 | 2/2006 |
| KR | 10-2006-0014088 | 2/2006 |

(Continued)

OTHER PUBLICATIONS

Bobcock, et al "Query Processing, Resource Management, and Approximation in a Data Stream Management System" in Proceedings of the 2003 CIDR Conference.*

(Continued)

*Primary Examiner* — Wing F Chan
*Assistant Examiner* — Raji Krishnan
(74) *Attorney, Agent, or Firm* — NSIP Law

(57) ABSTRACT

Provided are a method and apparatus for controlling load shedding for excluding data streams input into a data stream management system (DSMS). A method of selecting data not to be in the data process may be determined. A load shedding factor may also be determined. Data streams of the data process may be processed by applying the method of selecting the data according to the load shedding factor.

15 Claims, 14 Drawing Sheets

(56) References Cited

U.S. PATENT DOCUMENTS

| | | | |
|---|---|---|---|
| 2011/0047084 A1* | 2/2011 | Manzalini et al. | 705/301 |
| 2011/0251507 A1* | 10/2011 | Xue et al. | 600/521 |
| 2012/0215934 A1* | 8/2012 | Barsness et al. | 709/231 |
| 2013/0103348 A1* | 4/2013 | Cao et al. | 702/181 |
| 2013/0268560 A1* | 10/2013 | Pallares Lopez et al. | 707/770 |

FOREIGN PATENT DOCUMENTS

| | | |
|---|---|---|
| KR | 10-2006-0024423 | 3/2006 |
| KR | 10-2006-0059334 | 6/2006 |
| KR | 10-2006-0063591 | 6/2006 |
| KR | 10-2007-0060992 | 6/2007 |
| KR | 10-2007-0081860 | 8/2007 |
| KR | 10-2009-0076675 | 7/2009 |

OTHER PUBLICATIONS

Babcock et al., "Load Shedding Techniques for Data Stream System," Department of Computer Science, Stanford University, 2003, pp. 1-3.

Kim, Dong Min, "Congestion Control in TCP Connection Containing Wireless Link," Department of Electrical and Electronic Engineering, Yongsei University, pp. 1-59.

Tatbul, Nesime, et al. "Load Shedding in a data stream manager," *Proceedings of the 29th international conference on Very large data bases*, vol. 29, pp. 309-320.

* cited by examiner

METHOD AND APPARATUS FOR CONTROLLING LOAD SHEDDING IN DATA STREAM MANAGEMENT SYSTEM

CROSS-REFERENCE TO RELATED APPLICATION(S)

This application claims the benefit under 35 U.S.C. §119(a) of Korean Patent Application No. 10-2011-0040139, filed on Apr. 28, 2011, in the Korean Intellectual Property Office, the entire disclosure of which is incorporated herein by reference for all purposes.

BACKGROUND

1. Field

The following description relates to data processing, and more particularly, to the control of load shedding in a data stream management system (DSMS).

2. Description of the Related Art

Recent developments in the health care field make it possible to transmit information about a patient's state to a medical team from home or from a work place without the patient having to make a visit. This allows a patient to receive treatment remotely. A system for remotely providing a medical service is referred to as a connected healthcare system or a ubiquitous healthcare (U-healthcare) system.

For example, a U-healthcare system may measure electrical activity of a patient's heart using an electro-cardiogram (ECG) and transmit the results to a remote hospital in order to prevent and treat heart disease.

A U-healthcare system may collect medical information from a sensor that is attached to a patient's body, and may transmit data to a server of a hospital through a portable device. However, resources provided by a central processing unit (CPU) and a power supply unit of a portable device are typically less efficient in comparison to resources provided by a CPU and a power supply unit of a server. Also, a server may lack in resources due to a high CPU usage. Thus, there is a need to control an amount of data to be processed.

Load shedding is an example of a method of excluding some data streams of a data process that are input into a data stream management system (DSMS).

SUMMARY

In one general aspect, there is provided a method of controlling load shedding for excluding data streams of a data process input into a data stream management system (DSMS), the method including determining a method of selecting the data to be in the data process from the data streams or selecting data not to be in the data process from the data streams, determining a load shedding factor comprising a rate of the data not to be in the data process from the data streams, based on an amount of resources used by the DSMS or a remaining amount of resource, and selecting data streams which are to be in the data process or not to be in the data process and performing data processing on the data that is to be in the data process by applying the method of selecting the data according to the load shedding factor.

The method of selecting data may be determined based on a query of a user.

The method of selecting data may comprise selecting data generated before a specific time determined based on the load shedding factor.

The method of selecting data may comprise selecting corresponding data at a time interval determined based on the load shedding factor.

The method of selecting data may comprise performing a query operation in a sliding manner according to a sliding interval determined based on the load shedding factor.

The load shedding factor may be determined based on an amount of remaining power of a power supply unit of the DSMS.

The determining the load shedding factor based on the amount of remaining power of the power supply unit of the DSMS may comprise determining the load shedding factor as 0, if the amount of remaining power of the power supply unit is greater than a reference amount, and selecting the load shedding factor as a value between 0 and 1 for each region, according to a reduction in the amount of remaining power, if the amount of remaining power of the power supply unit is less than the reference amount.

The load shedding factor may be determined based on an amount of use of a processor of the DSMS.

The determining the load shedding factor based on the amount of use of the processor of the DSMS may comprise determining the load shedding factor as 0, if the amount of use of the processor is less than a reference amount, and selecting the load shedding factor as a value between 0 and 1 for each region, according to an increase of the amount of use of the processor, if the amount of use of the processor is greater than the reference amount.

In another aspect, there is provided an apparatus for controlling load shedding for excluding data streams of a data process input into a data stream management system (DSMS), the apparatus including a storage unit configured to store the data streams, and a control unit configured to determine a method of selecting the data to be in the data process from the data streams or selecting data not to be in the data process from the data streams, determine a load shedding factor comprising a rate of the data not to be in the data process from the data streams, based on an amount of resources used by the DSMS or a remaining amount of resources, and select data streams which are to be in the data process or not to be in the data process and perform data processing on the data that is to be in the data process by applying the method of selecting the data according to the load shedding factor.

The method of selecting data may be determined based on a query of a user.

The method of selecting data may comprise selecting data before a specific time determined based on the load shedding factor.

The method of selecting data may comprise selecting corresponding data at a time interval determined based on the load shedding factor.

The method of selecting data may comprise performing a query operation in a sliding manner according to a sliding interval determined based on the load shedding factor.

The load shedding factor may be determined based on an amount of remaining power of a power supply unit of the DSMS.

The load shedding factor may be determined as 0, if the amount of remaining power of the power supply unit is greater than a reference amount, and the load shedding factor may be determined as a value between 0 and 1 for each region, according to a reduction in the amount of remaining power, if the amount of remaining power of the power supply unit is less than the reference amount.

The load shedding factor may be determined based on an amount of use of a processor of the DSMS.

The load shedding factor may be determined as 0, if the amount of use of the processor is less than a reference amount, and the load shedding factor may be determined as a value from 0 and 1 for each region, according to an increase of the amount of use of the processor, if the amount of use of the processor is greater than the reference amount.

In another aspect, there is provided a computer-readable storage medium having recorded thereon a program for executing a method of controlling load shedding for excluding data streams of a data process input into a data stream management system (DSMS), the method including determining a method of selecting the data to be in the data process from the data streams or selecting data not to be in the data process from the data streams, determining a load shedding factor comprising a rate of the data not to be in the data process from the data streams, based on a used amount of resources used by a DSMS execution apparatus or a remaining amount of the resources, and selecting data streams which are to be in the data process or not to be in the data process and performing data processing on the data to be in the data process by applying the method of selecting the data according to the load shedding factor.

Other features and aspects may be apparent from the following detailed description, the drawings, and the claims.

Figure 1:
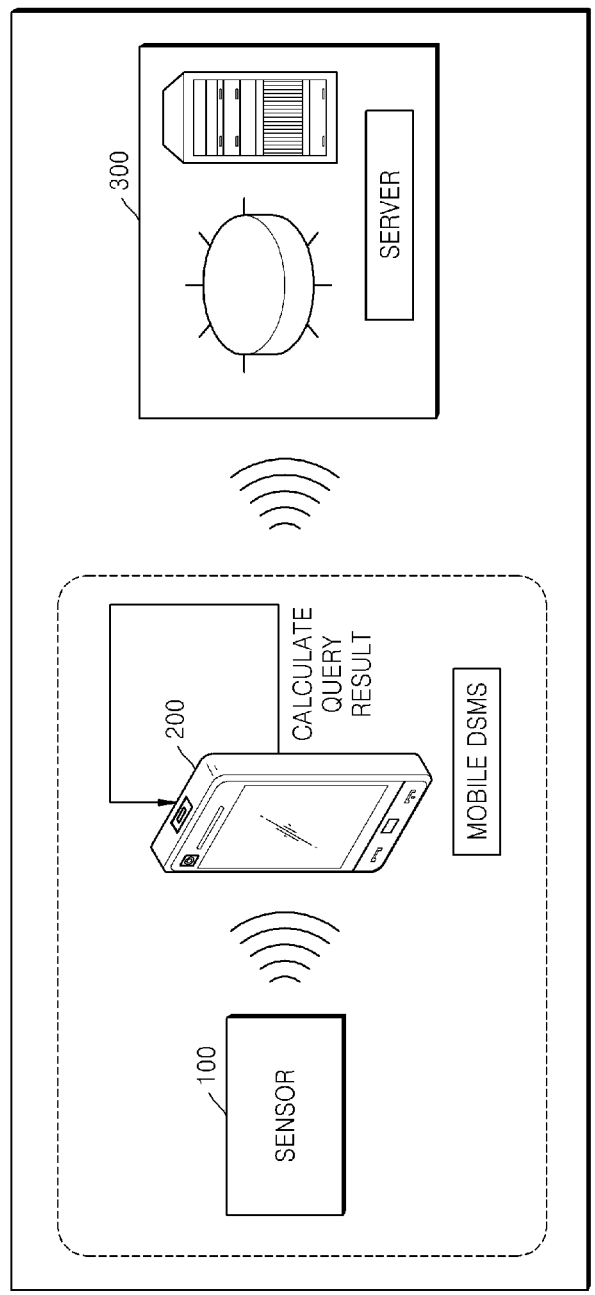
FIG. 1 is a diagram illustrating an example of a ubiquitous healthcare (U-healthcare) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a ubiquitous healthcare (U-healthcare) system.

As shown in FIG. 1, a sensor 100 is attached to a patient, for example, a human body to collect medical information. The medical information may be transmitted to a server 300. However, because it may be difficult for the sensor 100 to transmit data to a remote place, the sensor 100 may transmit the data to the server 300 through a portable device 200. For example, the portable device may be a terminal such as a smart phone, a cellular phone, a medical device, a tablet, and the like.

When the sensor 100 wirelessly transmits data, the portable device 200 may receive the data and transmit the data to the server 300. In this example, the portable device 200 functions as a gateway.

In some embodiments, the portable device 200 may also process the data as well as transmitting the data from the sensor 100 to the server 300. In this example, a mobile data stream management system (DSMS) may be installed and operate in the portable device 200.

A DSMS may be installed and operate in the server 300. The DSMS installed in the server 300 may collect medical information from a plurality of sensors. The server 300 may have a high central processing unit (CPU) usage.

Figure 2:
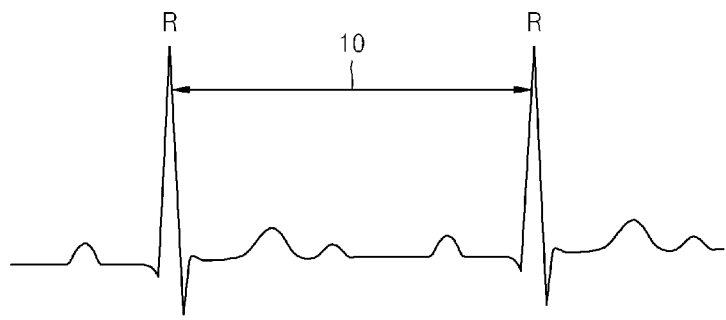
FIG. 2 is a diagram illustrating an example of a waveform of electro-cardiogram (ECG) data.

FIG. 2 illustrates an example of a waveform of electro-cardiogram (ECG) data. Referring to FIG. 2, an interval between two consecutive peak values R is an R-R interval. For example, the R-R interval 10 may gradually increase. A query may be generated for querying such a data stream in a DSMS.

An example of a query for detecting gradual slowing of the R-R interval 10 of FIG. 2 is below.

[Query 1]
SELECT count(*)
FROM ECG_STREAM [RANGE 1 Hour] AS ES
WHERE ES.R-R Interval>threshold Referring to Query 1, an ECG data stream (ECG_STREAM in the query 1) data generated for an hour is referred to as ES. The number of R-R intervals of the ES that become longer than a threshold may be counted.

A DSMS may use load shedding to remove some of the data that is input into the DSMS and process the remaining data in order to secure a quality of service (QoS). By shedding data, for example, the DSMS is able to more efficiently process the remaining data.

Figure 3:
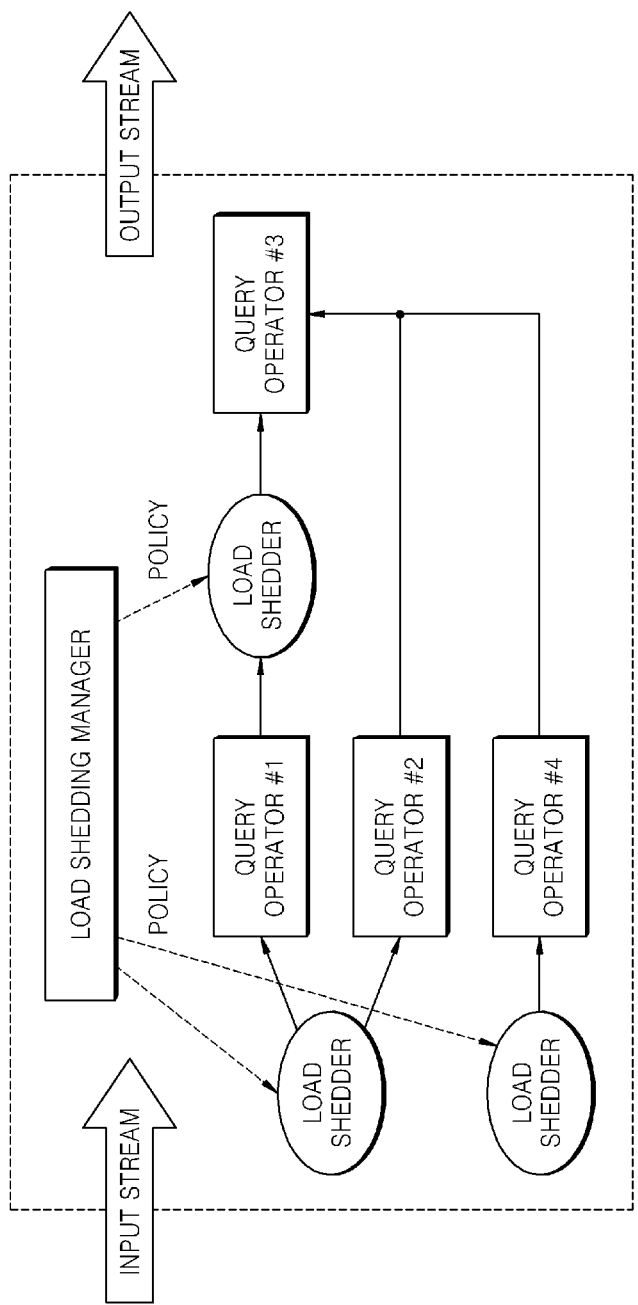
FIG. 3 is a diagram illustrating an example of a data stream management system (DSMS) to which load shedding is applied.

FIG. 3 illustrates an example of a DSMS to which load shedding is applied.

Load shedding may be performed by a load shedder. For example, the load shedder may arbitrarily remove data or may remove data according to a predetermined rule. The rule used by the load shedder may be, for example, a priority of an operator.

For example, data transmission from a sensor may become intermittent (this is referred to as an intermittence situation), or resources of the portable device may become insufficient due to a large amount of data that is processed by the portable device. In these examples, load shedding may be performed in a DSMS of a portable device.

Load shedding is also beneficial for a server and a portable device because the server receives medical data from a plurality of sensors which results in a very high CPU usage to process the medical data.

Transmitting data from sensors in real time would be ideal, however, it may be difficult for sensors to transmit data in real time due behavior patterns of a user of the portable device. For example, it may be difficult for sensors to transmit data in real time when a portable device is placed outside of a transmission range of a sensor, for example, in order to charge the portable device or if the user moves to a different place.

It may also be inefficient to transmit data in real time because transmission of data in real time may consume a great deal of battery power. Thus, sensors may store collected information and periodically transmit the information to the portable device at a predetermined period of time.

Intermittence may frequently occur in a user environment. The intermittence may influence transmission of data. For example, although data is supposed to be transmitted every 10 minutes, if the data is transmitted in one hour because of the intermittence, an amount of data to be transmitted and processed may be rapidly increased.

Typically a CPU and a battery of a portable device have limited resources, and thus it is difficult to simultaneously process a large amount of data streams or a large amount of data that is simultaneously received. Thus, load shedding may be applied to control a data input and throughput according to a status of the portable device.

For example, load shedding may be applied to control data input and throughput according to a usage amount of a processor such as a CPU of the server executing the DSMS.

As an example if the user moves beyond a receipt range of the portable device for 3 hours, the portable device is unable to receive data from sensors for those 3 hours. Thereafter, if sensors and the portable device communicate with each other again, sensors simultaneously transmit 3 hours of sensed data to the portable device. In this example, if a lot of queries such as the query 1 are used, a large amount of data to be processed is generated which increases a load of the portable device. In this case, random load shedding may lead to an unintended result. Thus, load shedding may be controlled with respect to a user's intention and data property. That is, a method of selecting and removing data having low importance or bypassing data processing according to circumstances may be used.

Figure 4:
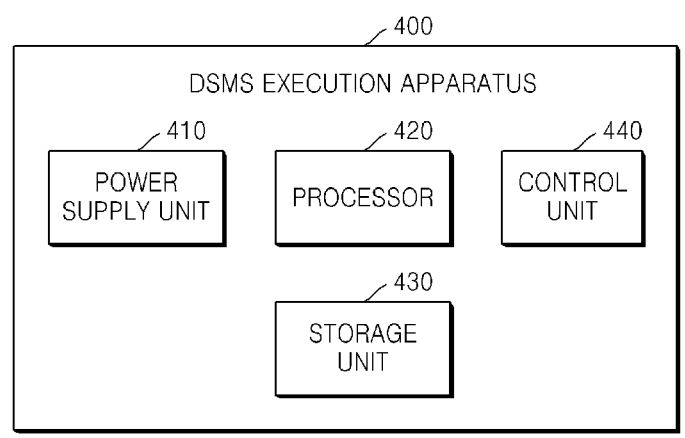
FIG. 4 is a diagram illustrating an example of a load shedding control device.

FIG. 4 illustrates an example of a load shedding control device.

Referring to FIG. 4, a DSMS execution apparatus 400 includes a power supply unit 410, a processor 420, a storage unit 430, and a control unit 440. For example, the DSMS execution apparatus 400 that may be a portable device or a server.

The load shedding control device in this example is included in the DSMS execution apparatus 400. For example, the load shedding control device may be included in the portable device and/or the server.

The load shedding control device may include the storage unit 430 and the control unit 440. Alternatively, the load shedding control device may include the processor 420 that may function as the control unit 440.

The power supply unit 410 may supply power to the DSMS execution apparatus 400. An example of the power supply unit 410 of the portable device is a battery.

The processor 420 may execute a DSMS. An example of the processor 420 is a CPU.

The control unit 440 may control load shedding. For example, the control unit 440 may determine a method of selecting data for load shedding, and determine a load shedding factor based on an amount of remaining power of the power supply unit 410 or a used amount of the processor 420. The control unit 440 may perform load shedding by selecting data which is to be included in a data process and data that is not to be included in the data process from input data streams based on the load shedding factor. The control unit 440 may select the data and perform data processing on the data that is included in the data process.

The storage unit 430 may store the input data streams.

Figure 5:
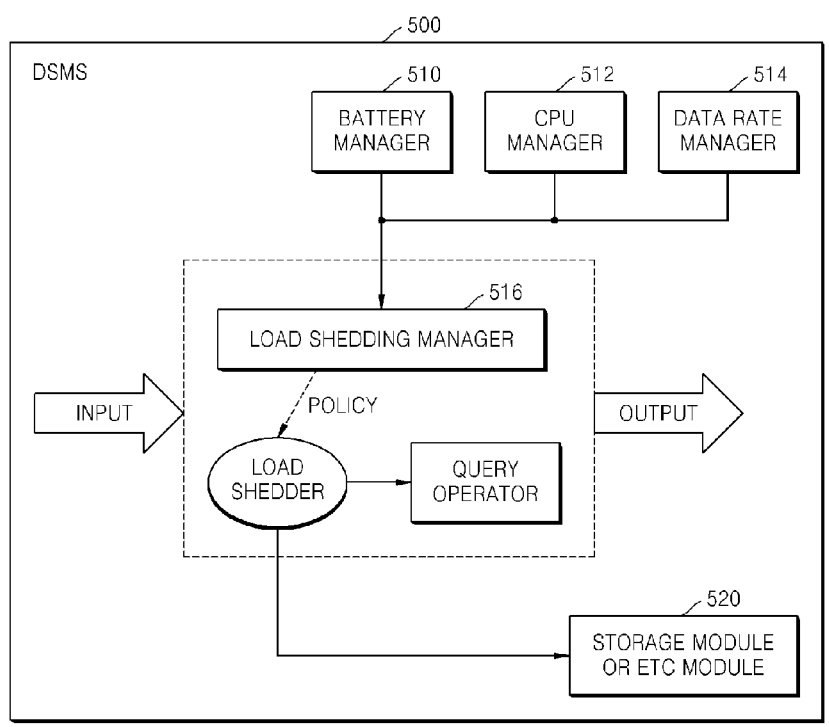
FIG. 5 is a diagram illustrating another example of a load shedding control device.

FIG. 5 illustrates another example of a load shedding control device.

Referring to FIG. 5, load shedding control device 500 includes a battery manager 510, a CPU manager 512, a data rate manager 514, a load shedding manager 516, and a storage module or other module 520. For example, the load shedding control device 500 may be included in a portable device and/or in a server.

The battery manager 510 may check an amount of remaining power of a power supply device, and transmit information about the amount of remaining power to the load shedding manager 516.

The CPU manager 512 may confirm a load status of a CPU and transmit the load status of the CPU to the load shedding manager 516.

The data rate manger 514 may check an amount of input data streams and transmit information about the amount of input data streams to the load shedding manager 516.

The load shedding manager 516 may determine a load shedding factor based on the amount of remaining power of the battery and/or the load status of the CPU. The load shedding manager 516 may determine a method of selecting data to be removed from the data streams, and transmit a load shedding policy to a load shedder to select and remove the data from the input data streams based on the load shedding factor. The load shedding manager 516 may select data to be removed.

For example, the load shedder may perform load shedding in response to a query operator.

Figure 6:
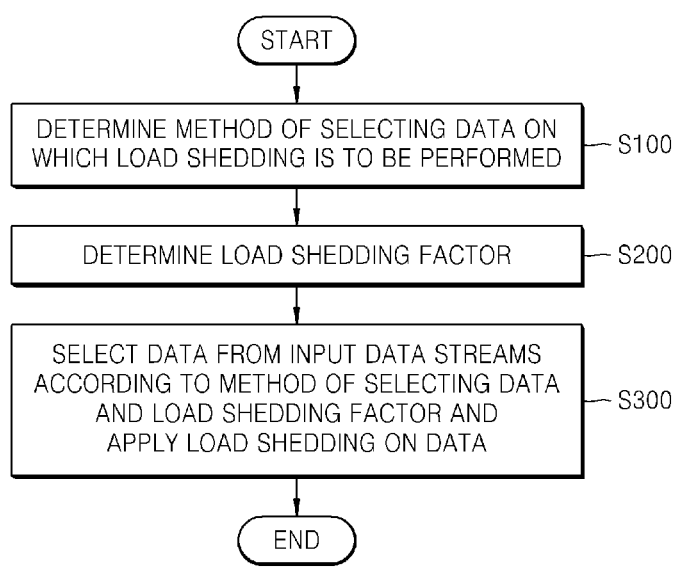
FIG. 6 is a flowchart illustrating an example of a method of controlling load shedding.

FIG. 6 illustrates an example of a method of controlling load shedding.

Referring to FIG. 6, a DSMS determines a method of selecting data on which load shedding is to be performed (operation S100). The DSMS determines a load shedding factor (operation S200). The DSMS selects the data from input data streams based on the method of selecting the data and the load shedding factor and applies load shedding to the data (operation S300). In various embodiments, operation S100 may be performed subsequent to operation S200.

In various examples, a load shedding policy may be determined based on a user's intention. The load shedding policy is a method of selecting data that is to be excluded from a data process. The user's intention in the load shedding policy may be determined by analyzing content described in a query that is composed by the user.

For example, a method of load shedding may be determined based on a user's intention when the user composes the query. Example methods of load shedding expressing the user's intention in the query are as follows:

1. Load shedding is performed by removing data generated before a specific time designated by the user. In this example, a user may insert a phrase "allow dropping past" in the query to perform load shedding. Examples of this first method are described with reference to FIGS. 8 and 12.

2. Load shedding is performed by removing data at a time interval determined based on the load shedding factor from whole data streams. In this example, a user may insert a phrase "allow sampling" in the query to perform load shedding. Examples of this second method are described with reference to FIGS. 9 and 13.

3. Load shedding is performed by performing a query operation in a sliding manner according to a sliding interval that is determined based on the load shedding factor. In this example, the user may insert a phrase "flexible" in the query to perform load shedding. Examples of this third method are described with reference to FIGS. 10 and 14.

Figure 7:
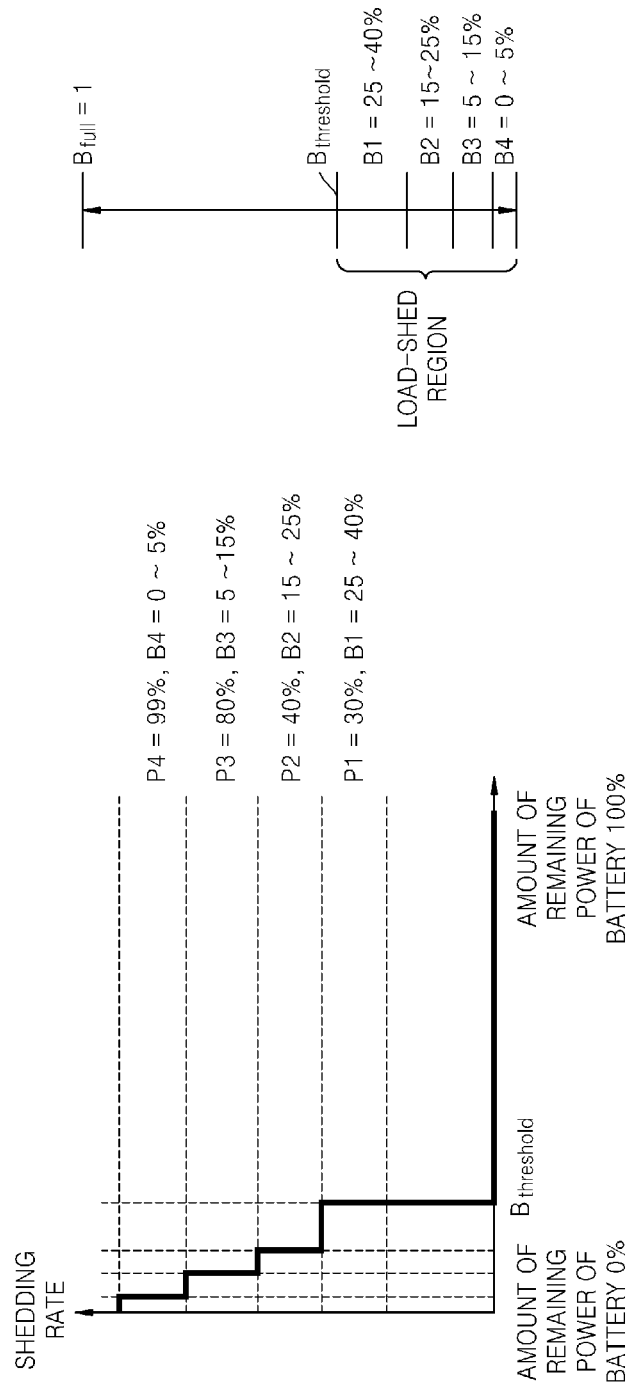
FIG. 7 is a graph illustrating an example of determining a load shedding factor based on an amount of remaining power of a power supply unit.

FIG. 7 illustrates an example of determining a load shedding factor based on an amount of remaining power of a power supply unit.

Referring to FIG. 7, the amount of remaining power of a battery is divided into 5 regions, and the load shedding factor is designated for each region. The load shedding factor is a shedding rate. In this example, the shedding rate is expressed as a function of the amount of remaining power of the battery.

In this example, Bthreshold corresponds to a reference amount. If the amount of remaining power of the battery is larger than the Bthreshold, the load shedding factor is 0. The amount of remaining power of the battery that is smaller than the Bthreshold is divided into 4 regions B1, B2, B3, and B4, and different load shedding factors P1, P2, P3, and P4 are designated for the four regions B1, B2, B3, and B4, respectively.

Thus, if the amount of remaining power of the battery is larger than 40%, the load shedding factor is 0, if the amount of remaining power of the battery is between about 25% and about 40%, the load shedding factor is 30%, if the amount of remaining power of the battery is between about 15% and about 25%, the load shedding factor is 40%, if the amount of remaining power of the battery is between about 5% and about 15%, the load shedding factor is 80%, and if the amount of remaining power of the battery is between 0 and about 5%, the load shedding factor is 99%.

In this example the Bthreshold is 40% as shown in FIG. 7, and if the amount of remaining power of the battery is less than 40%, load shedding is performed.

Figure 8:
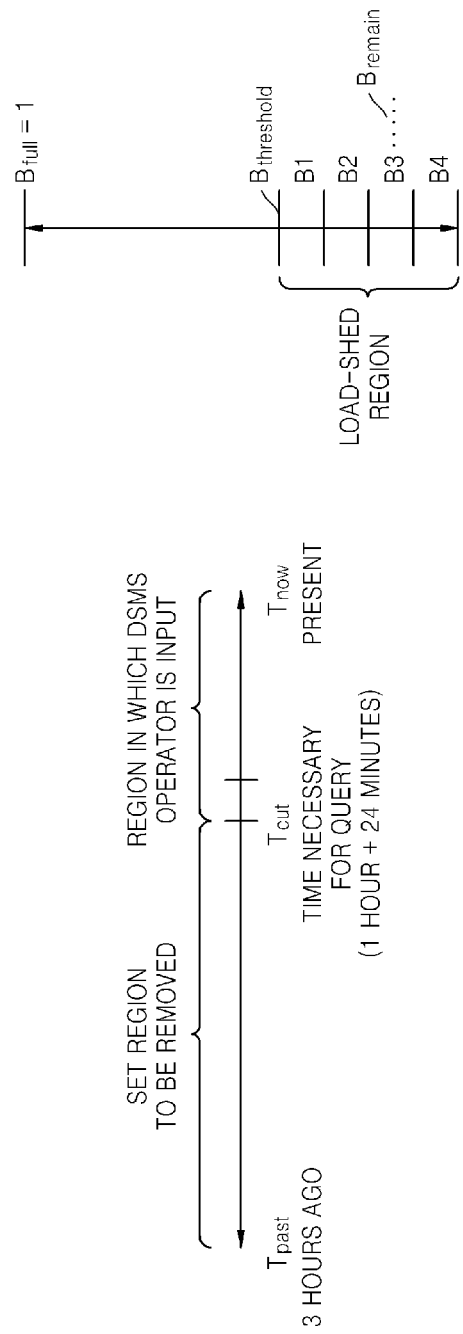
FIG. 8 is a diagram illustrating an example of selecting data based on a load shedding factor.

FIG. 8 illustrates an example of selecting data based on a load shedding factor. In FIG. 8, data generated before a specific time is selected using a load shedding factor that is determined based on an amount of remaining power of a power supply unit. In this example, a user determines a method of load shedding removing past data with respect to the specific time.

The user may insert the phrase "allow dropping past" in query 2 shown below to perform the method of load shedding.

[Query 2]
SELECT count(*)
FROM ECG_STREAM [RANGE 1 Hour allow dropping past] AS ES
WHERE ES.R-R Interval>threshold The load shedding factor is determined based on the amount of remaining power. A specific time Tcut for removing data is determined using a window size designated in query 2, the determined load shedding factor, and a start time Tpast of a received data stream.

If the amount of remaining power is in a region B3 as shown in FIG. 8, the load shedding factor is determined as 80%.

A window size of 1 hour is extracted from a phrase "RANGE 1 Hour" as shown in query 2 above.

The start time Tpast is 3 hours when a DSMS received the data stream generated 3 hours before as shown in FIG. 8.

The specific time Tcut for removing data is determined according to the following equation.

$$T\text{cut}=\text{window size}+(T\text{past}-\text{window size})*(1-\text{load shedding factor})=1\text{ hour}+(3\text{ hours}-1\text{ hour})*(1-0.8)=1\text{ hour }24\text{ minutes}$$

Thus, as shown in FIG. 8, data generated from 3 hours before to before 1 hour plus 24 minutes is removed, and data generated from the last 1 hour plus 24 minutes to the present is input into a DSMS operator.

Figure 9:
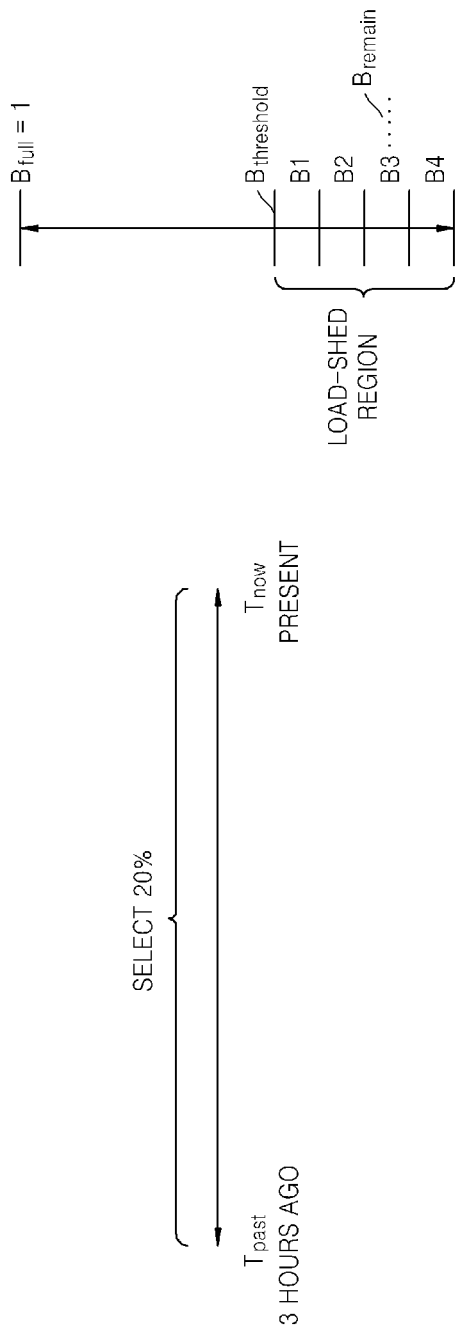
FIG. 9 is a diagram illustrating an example of removing data based on a load shedding factor.

FIG. 9 illustrates an example of removing data based on a load shedding factor. In FIG. 9, data is removed at the same time interval determined using a load shedding factor that is determined based on an amount of remaining power of a power supply unit. In this example, a user determines a method of removing data at the same time interval.

The user may allow load shedding to be performed by inserting the phrase "allow sampling" in query 3 shown below.

[Query 3]
SELECT count(*)
FROM ECG_STREAM [RANGE 1 Hour allow sampling] AS ES
WHERE ES.R-R Interval>threshold The load shedding factor is determined based on the amount of remaining power. Referring to FIG. 9, if the amount of remaining power is in a region B3 between about 5% and about 15%, the load shedding factor is 80%.

A sampling ratio used to select data based on the load shedding factor is calculated below.

$$\text{Sampling ratio}=1-\text{load shedding factor}=1-0.8=0.2$$

Thus, 20% of whole input data streams are selected. For example, two pieces of data are selected from 10 pieces of data streams in the same time interval in order of time.

Figure 10:
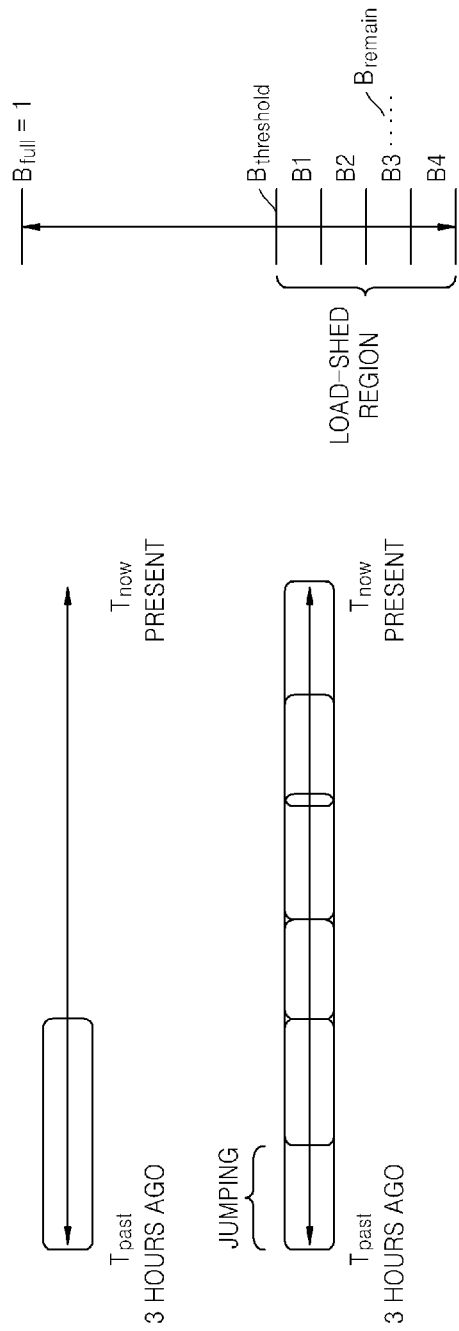
FIG. 10 is a diagram illustrating an example of calculating a sliding interval based on a load shedding factor.

FIG. 10 illustrates an example of calculating a sliding interval based on a load shedding factor. In FIG. 10, a sliding interval is calculated using a load shedding factor that is determined based on an amount of remaining power of a power supply unit. In this example, a user determines a query operation to be performed in a sliding manner.

The user may allow load shedding to be performed by inserting the phrase "flexible" in query 4 shown below.

[Query 4]
SELECT count(*)
FROM ECG_STREAM [RANGE 1 Hour slide 1 minute flexible] AS ES
WHERE ES.R-R Interval>threshold The load shedding factor is determined based on the amount of remaining power. Referring to FIG. 10, the load shedding factor is determined as 80% by reading the amount of remaining power through a previously determined function.

Next, the sliding interval is determined using a window size designated in a query, a sliding unit designated in a query, the determined load shedding factor, and a start time Tpast of a received data stream.

A window size of 1 hour is extracted from a phrase "RANGE 1 Hour" as shown in query 4 above.

The sliding unit designated by inserting a phrase "slide 1 minute" in query 4 is the sliding interval that has no load shedding.

The sliding interval is determined according to equation below when load shedding is applied.

$$\text{Sliding interval}=T\text{past}/(T\text{past}/\text{sliding unit}*(1-\text{load shedding factor}))=180\text{ minutes}/(180\text{ minutes}/1\text{ minute}*(1-0.8))=5\text{ minutes}$$

That is, when there is no load shedding, the sliding interval is calculated by applying a window once a minute for 180 minutes, whereas, if the load shedding factor is 0.8, the sliding interval is calculated by applying the window 36 times over the same period of 180 minutes. That is, applying the window 180 times is reduced by 80% to being applied 36 times over the same amount of time. Thus, the sliding interval is jumped every 5 minutes and calculated.

As described herein, load shedding is performed by reflecting a user's intention described in a query, thereby providing the user with a more exact result.

Furthermore, data of a predetermined ratio is removed from data streams or a window sliding interval is jumped and calculated based on a load shedding factor determined based on an amount of remaining power of a power supply unit. In doing so, data that has no operation importance or less operation importance may be selected, thereby reducing the number of operations of a CPU of a portable device and reducing battery consumption thereof.

Figure 11:
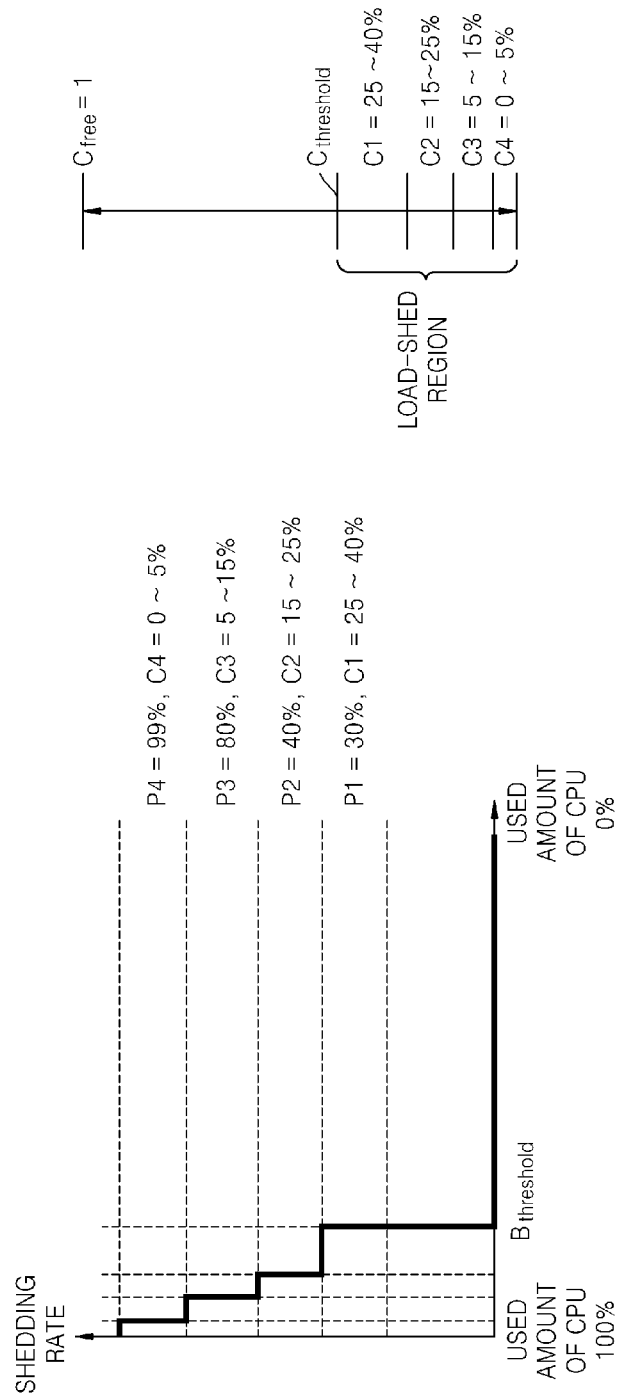
FIG. 11 is a graph illustrating an example of determining a load shedding factor based on an amount of use of a processor for executing a DSMS.

FIG. 11 illustrates an example of determining a load shedding factor based on a use rate of a processor for executing a DSMS.

Referring to FIG. 11, the use rate of a CPU is divided into 5 regions for which load shedding factors are designated. In this example, the load shedding factors are expressed as a function of the use rate of the CPU.

For example, if the use rate of the CPU is less than a threshold Cthreshold, the load shedding factor is 0. The use rate of the CPU that is greater than the threshold Cthreshold is divided into four regions C1, C2, C3, and C4, and four different load shedding factors P1, P2, P3, and P4 are designated for the four regions C1, C2, C3, and C4.

In this example, if the use rate of the CPU is less than 40%, the load shedding factor is 0, if the use rate of the CPU is between about 25% and about 40%, the load shedding factor is 30%, if the use rate of the CPU is between about 15% and about 25%, the load shedding factor is 40%, if the use rate of the CPU is between about 5% and about 15%, the load shedding factor is 80%, and if the use rate of the CPU is between 0 and 5%, the load shedding factor is 99%.

In this example, the threshold Cthreshold is 40% as shown in FIG. 11. In other words, if the use rate of the CPU is greater than 40%, load shedding is performed.

Figure 12:
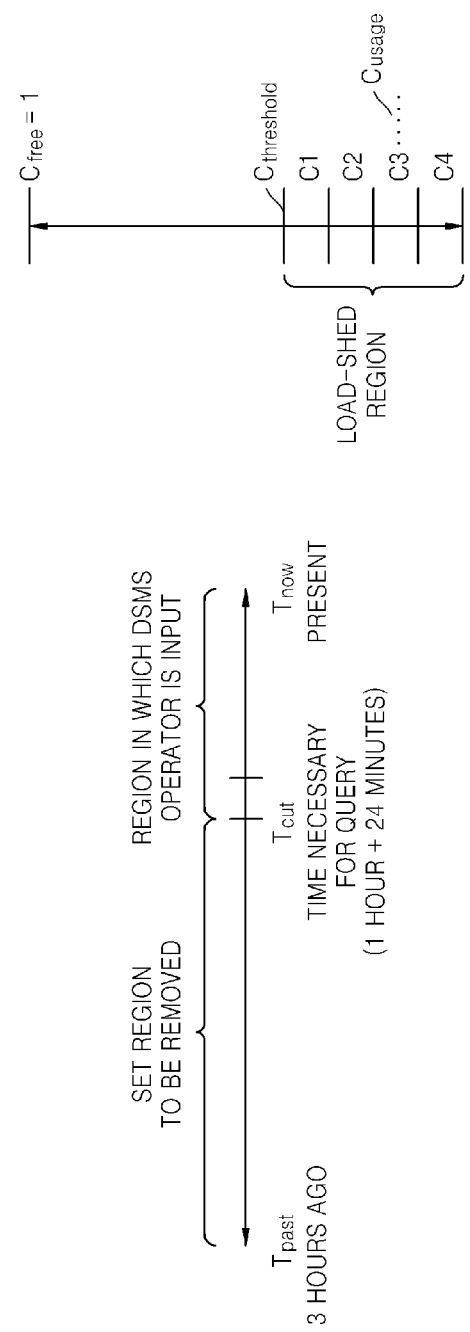
FIG. 12 is a diagram illustrating another example of selecting data based on a load shedding factor.

FIG. 12 illustrates another example of selecting data based on a load shedding factor. In FIG. 12, data generated before a specific time is selected using a load shedding factor that is determined based on a use amount of a processor. In this example, a user determines a method of load shedding removing previous data generated before the specific time.

The user may insert the phrase "allow dropping past" in query 5 shown below to perform load shedding above.

[Query 5]
SELECT count(*)
FROM ECG_STREAM [RANGE 1 Hour allow dropping past] AS ES
WHERE ES.R-R Interval>threshold The load shedding factor is determined based on a used amount of a CPU, and the specific time Tcut for removing data is determined using a window size designated in a query, the determined load shedding factor, and the start time Tpast of a received data stream.

When the used amount of the CPU is in the region B3 as shown in FIG. 12, the load shedding factor is determined as 80%.

A window size of 1 hour is extracted from a phrase "RANGE 1 Hour" as shown in query 5 above.

The start time Tpast is 3 hours when a DSMS received the data stream generated 3 hours before as shown in FIG. 12.

The specific time Tcut for removing data is determined according to an equation below.

$$T\text{cut}=\text{window size}+(T\text{past}-\text{window size})*(1-\text{load shedding factor})=1\text{ hour}+(3\text{ hours}-1\text{ hour})*(1-0.8)=1\text{ hour }24\text{ minutes}$$

Thus, as shown in FIG. 12, data that is generated from 3 hours before to 1 hour 24 minutes before is removed, and data generated from the last 1 hour 24 minutes to the present is input into a DSMS operator.

Figure 13:
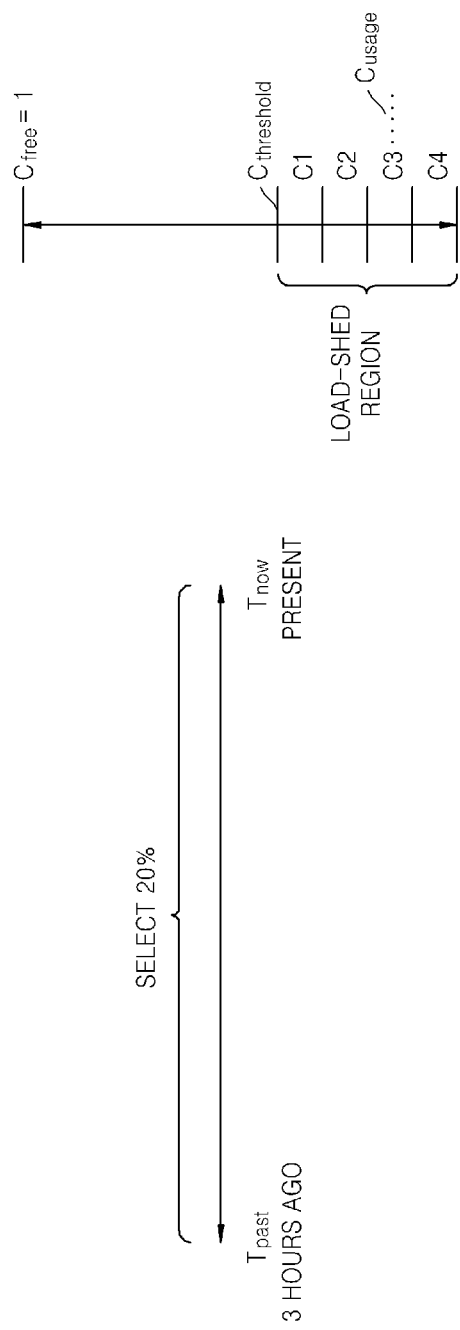
FIG. 13 is a diagram illustrating an example of removing data at a time interval determined based on a load shedding factor.

FIG. 13 illustrates an example of removing data at a time interval determined based on a load shedding factor. In FIG. 13, data is removed at the same time interval that is determined using a load shedding factor that is determined based on an amount of use of a processor. In this example, a user determines a method of removing data in the same time interval.

The user may allow load shedding to be performed by inserting the phrase "allow sampling" in query 6 shown below.

[Query 6]
SELECT count(*)
FROM ECG_STREAM [RANGE 1 Hour allow sampling] AS ES
WHERE ES.R-R Interval>threshold The load shedding factor is determined based on the use amount of a CPU. Referring to FIG. 13, if the CPU use is in the region B3 between about 5% and about 15%, the load shedding factor is 80%.

A sampling ratio used to select data based on the load shedding factor is calculated below.

$$\text{Sampling ratio}=1-\text{load shedding factor}=1-0.8=0.2$$

Thus, 20% of all input data streams are selected. For example, 2 pieces of data are selected from 10 pieces of data streams in the same time interval in order of time.

Figure 14:
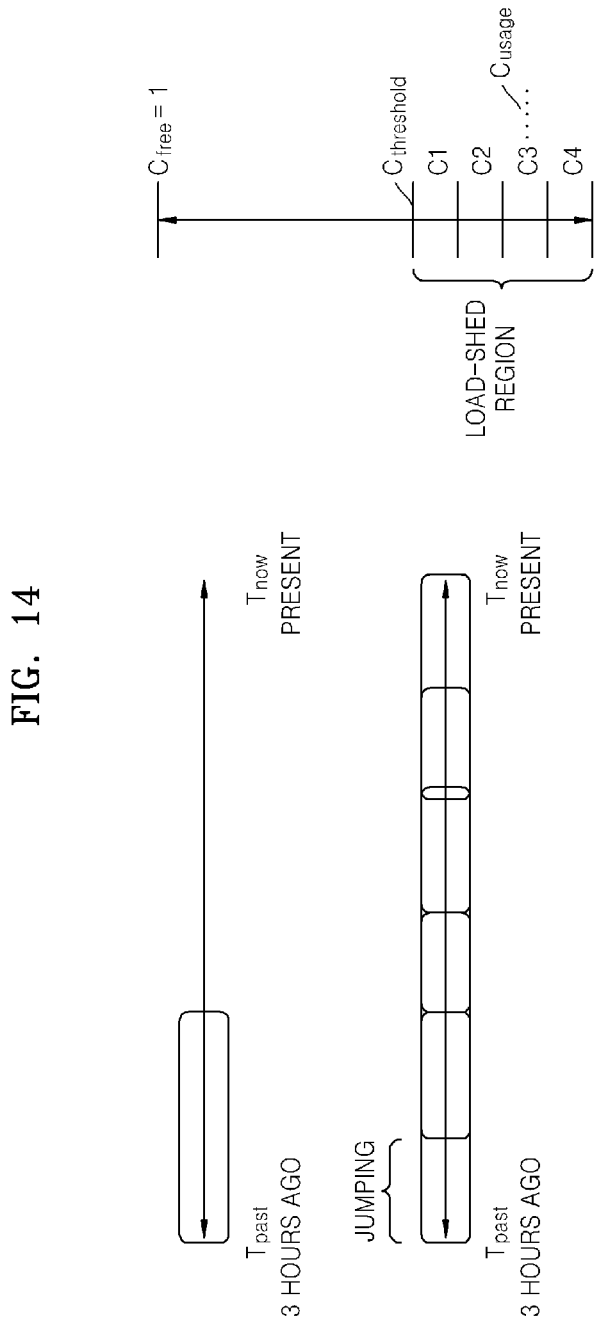
FIG. 14 is a diagram illustrating an example of calculating a sliding interval based on a load shedding factor.

FIG. 14 illustrates an example of calculating a sliding interval based on a load shedding factor. In FIG. 14, a sliding interval is calculated using a load shedding factor that is determined based on an amount of use of a processor. In this example, a user determines a query operation to be performed in a sliding manner.

The user may allow load shedding to be performed by inserting the phrase "flexible" in query 7 shown below.

[Query 7]
SELECT count(*)
FROM ECG_STREAM [RANGE 1 Hour slide 1 minute flexible] AS ES
WHERE ES.R-R Interval>threshold The load shedding factor is determined based on the use amount of a CPU. Referring to FIG. 14, the load shedding factor is determined as 80% by reading the use amount of the CPU through a previously determined function.

Next, the sliding interval is determined using a window size designated in a query, a sliding unit designated in a query, the determined load shedding factor, and the start time Tpast of a received data stream.

A window size of 1 hour is extracted from a phrase "RANGE 1 Hour" as shown in query 7 above.

The sliding unit designated by inserting a phrase "slide 1 minute" in query 7 is the sliding interval that has no load shedding.

The sliding interval is determined according to the equation below when load shedding is applied.

Sliding interval=$T_{past}$/($T_{past}$/sliding unit*(1−load shedding factor)=180 minutes/(180 minutes/1 minute*(1−0.8))=5 minutes That is, when there is no load shedding, the sliding interval is calculated by applying a window once a minute for 180 minutes, whereas, when the load shedding factor is 0.8, the sliding interval is calculated by applying the window 36 times over the same period of 180 minutes. Thus, the sliding interval is jumped every 5 minutes and calculated.

As described herein, load shedding may be performed based on a user's intention described in a query, thereby providing the user with a more exact result.

Furthermore, data of a predetermined ratio may be removed from data streams or a window sliding interval may be jumped and calculated according to a load shedding factor that is determined based on a use amount of a processor, which allows data having no operation importance to be selected, thereby reducing an operation of a CPU of a portable device and battery consumption thereof.

Although a healthcare and bio signal processing field are described in the present description, the present description can be applied to both a data signal processing field and an application field that uses signal processing with respect to time.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling load shedding for excluding data streams of a data process input into a data stream management system (DSMS), the method comprising:
   determining a load shedding policy, the load shedding policy being a method of selecting data to be in the data process from the data streams or selecting data not to be in the data process from the data streams;
   determining a load shedding factor comprising a rate of the data not to be in the data process from the data streams, based on an amount of resources used by the DSMS or a remaining amount of resources; and
   selecting data streams which are to be in the data process or not to be in the data process and performing data processing on the data that is to be in the data process by applying the load shedding policy according to the load shedding factor,
   wherein the load shedding policy is determined by analyzing content described in a query that is composed by the user, and the load shedding policy is differently determined according to the analyzed content,
   wherein the load shedding policy comprises selecting data not to be in the data process generated before a specific time, the specific time determined based on the load shedding factor, a window size designated in the query, and a start time of the data streams of the data process input into the DSMS.

2. The method of claim 1, wherein the load shedding policy comprises selecting corresponding data at a time interval determined based on the load shedding factor.

3. The method of claim 1, wherein the load shedding policy comprises performing a query operation in a sliding manner according to a sliding interval determined based on the load shedding factor.

4. The method of claim 1, wherein the load shedding factor is determined based on an amount of remaining power of a power supply unit of the DSMS.

5. The method of claim 4, wherein the determining the load shedding factor based on the amount of remaining power of the power supply unit of the DSMS comprises determining the load shedding factor as 0, if the amount of remaining power of the power supply unit is greater than a reference amount, and selecting the load shedding factor as a value between 0 and 1, according to a reduction in the amount of remaining power, if the amount of remaining power of the power supply unit is less than the reference amount.

6. The method of claim 1, wherein the load shedding factor is determined based on an amount of use of a processor of the DSMS.

7. The method of claim 6, wherein the determining the load shedding factor based on the amount of use of the processor of the DSMS comprises determining the load shedding factor as 0, if the amount of use of the processor is less than a reference amount, and selecting the load shedding factor as a value between 0 and 1, according to an increase of the amount of use of the processor, if the amount of use of the processor is greater than the reference amount.

8. An apparatus for controlling load shedding for excluding data streams of a data process input into a data stream management system (DSMS), the apparatus comprising:
a storage unit configured to store the data streams and a computer program; and
a processor executing the program, the program comprising instructions to determine a load shedding policy, the load shedding policy being a method of selecting data to be in the data process from the data streams or selecting data not to be in the data process from the data streams, and determine a load shedding factor comprising a rate of the data not to be in the data process from the data streams, based on an amount of resources used by the DSMS or a remaining amount of resources, and select data streams which are to be in the data process or not to be in the data process and perform data processing on the data that is to be in the data process by applying the load shedding policy according to the load shedding factor,
wherein the load shedding policy is determined by analyzing content described in a query that is composed by the user, and the load shedding policy is differently determined according to the analyzed content,
wherein the load shedding policy comprises selecting data not to be in the data process generated before a specific time, the specific time determined based on the load shedding factor, a window size designated in the query, and a start time of the data streams of the data process input into the DSMS.

9. The apparatus of claim 8, wherein the load shedding policy comprises selecting corresponding data at a time interval determined based on the load shedding factor.

10. The apparatus of claim 8, wherein the load shedding policy comprises performing a query operation in a sliding manner according to a sliding interval determined based on the load shedding factor.

11. The apparatus of claim 8, wherein the load shedding factor is determined based on an amount of remaining power of a power supply unit of the DSMS.

12. The apparatus of claim 11, wherein the load shedding factor is determined as 0, if the amount of remaining power of the power supply unit is greater than a reference amount, and the load shedding factor is determined as a value between 0 and 1, according to a reduction in the amount of remaining power, if the amount of remaining power of the power supply unit is less than the reference amount.

13. The apparatus of claim 8, wherein the load shedding factor is determined based on an amount of use of a processor of the DSMS.

14. The apparatus of claim 13, wherein the load shedding factor is determined as 0, if the amount of use of the processor is less than a reference amount, and the load shedding factor is determined as a value from 0 and 1, according to an increase of the amount of use of the processor, if the amount of use of the processor is greater than the reference amount.

15. A non-transitory computer-readable storage medium having recorded thereon a program for executing a method of controlling load shedding for excluding data streams of a data process input into a data stream management system (DSMS), the method comprising:
determining the load shedding policy, the load shedding policy being a method of selecting data to be in the data process from the data streams or selecting data not to be in the data process from the data streams;
determining a load shedding factor comprising a rate of the data not to be in the data process from the data streams, based on an amount of resources used by the DSMS or a remaining amount of resources; and
selecting data streams which are to be in the data process or not to be in the data process and performing data processing on the data to be in the data process by applying the load shedding policy according to the load shedding factor,
wherein the load shedding policy is determined by analyzing content described in a query that is composed by the user, and the load shedding policy is differently determined according to the analyzed content,
wherein the load shedding policy comprises selecting data not to be in the process generated before a specific time, the specific time determined based on the load shedding factor, a window size designated in the query, and a start time of the data streams of the data process input into the DSMS.

* * * * *